United States Patent
Park

(10) Patent No.: US 7,430,813 B2
(45) Date of Patent: Oct. 7, 2008

(54) DEVICE FOR MEASURING SEAL GAPS OF VEHICLES

(75) Inventor: Keun-Seop Park, Gwangnyeong-si (KR)

(73) Assignee: Kia Motors Corporation, Seoul (KR)

( * ) Notice: Subject to any disclaimer, the term of this patent is extended or adjusted under 35 U.S.C. 154(b) by 0 days.

(21) Appl. No.: 11/648,886

(22) Filed: Dec. 29, 2006

(65) Prior Publication Data

US 2008/0115379 A1    May 22, 2008

(30) Foreign Application Priority Data

Nov. 21, 2006    (KR) .................... 10-2006-0115173

(51) Int. Cl.
*G01D 21/00* (2006.01)
*G01B 3/38* (2006.01)

(52) U.S. Cl. .......................... 33/613; 33/542
(58) Field of Classification Search ................. 33/613, 33/542

See application file for complete search history.

(56) References Cited

U.S. PATENT DOCUMENTS

| 4,606,129 | A | | 8/1986 | Barrowman et al. ........... 33/613 |
| 4,862,598 | A | * | 9/1989 | Barlow et al. ................. 33/613 |
| 5,067,250 | A | * | 11/1991 | Auweiler et al. .............. 33/613 |
| 5,551,162 | A | * | 9/1996 | Struble ........................ 33/613 |
| 5,657,550 | A | * | 8/1997 | Struble ........................ 33/613 |
| 6,094,831 | A | * | 8/2000 | Shigyo ........................ 33/542 |
| 6,308,429 | B1 | | 10/2001 | Green et al. .................. 33/542 |
| 6,708,393 | B1 | * | 3/2004 | Roy et al. .................... 33/613 |
| 7,134,219 | B2 | * | 11/2006 | Wood et al. ................... 33/613 |

FOREIGN PATENT DOCUMENTS

KR    1020020033314    5/2002

* cited by examiner

*Primary Examiner*—Christopher W Fulton
(74) *Attorney, Agent, or Firm*—Morgan Lewis & Bockius LLP

(57) ABSTRACT

The present invention provides device for measuring a seal gap of a vehicle, which more conveniently and precisely measures the dimensions of a space between a moving part and a mounting part of a vehicle body, thus more precisely controlling the tolerance of a gap defined between the moving part and the mounting part. The device includes a plate member installed in a gap created between a moving part and a mounting part of a vehicle body; a gap sensor mounted to the plate member and configured to measure the dimensions of the seal gap; a transmitter outputting a value measured from the gap sensor; a receiver receiving a signal output from the transmitter; and operation processing equipment configured to process a value from the receiver and output the dimensions of the seal gap.

17 Claims, 6 Drawing Sheets

DEVICE FOR MEASURING SEAL GAPS OF VEHICLES

CROSS-REFERENCE TO RELATED APPLICATIONS

The present application is based on, and claims priority from, Korean Application Serial Number 10-2006-0115173, filed on Nov. 21, 2006, the disclosure of which is hereby incorporated by reference herein in its entirety.

FIELD OF THE INVENTION

The present invention relates to devices for measuring seal gaps of vehicles defined as a space between a moving part and a mounting part of a vehicle body and into which weatherstrip may be installed.

BACKGROUND OF THE INVENTION

Generally, a vehicle body is provided with various moving parts, for example, a trunk lid and a tailgate as well as front and rear doors. The moving parts are mounted to fixed mounting parts of the vehicle body in such a way as to be openable and closable.

At the intersection between the two parts, gaps are inevitably formed between the moving parts and the mounting parts of the vehicle body. Such gaps are generally referred to as "seal gaps." The gaps provide the necessary clearance to prevent interference between the moving part and the mounting part. While a vehicle is driving, wind noise may be transmitted through the seal gaps into the vehicle. Moreover, when it rains, rainwater may flow through the seal gaps into the vehicle.

Thus, in order to maintain the quietness and airtightness of the vehicle, various types of weatherstrips are installed in seal gaps created between the moving parts and corresponding mounting parts of the vehicle body.

When the weatherstrips are installed in the seal gaps, data on the exact dimensions of the respective gaps into which they are installed are required. To this end, existing devices collect the data about the seal gaps by filling the gap between the moving parts and the mounting parts of the vehicle body with resin or clay mold and measuring the resulting molded part.

In this case, the molded product may be deformed when it is removed or hardened, and thus it is difficult to measure precise dimensions. The hardened piece may be difficult to remove from the gap as well. Further, it takes an excessively long time to measure the seal gaps because the molded product must be hardened. The accuracy of the collected data is also dependent on the skill of the workers who measure the seal gaps.

What is needed is a device for measuring a seal gap which overcomes the above and other disadvantages.

SUMMARY OF THE INVENTION

The present invention provides a device for measuring a seal gap of a vehicle, that conveniently and accurately measures the dimensions of a space between a moving part and a mounting part of a vehicle body thus allowing more accurate control of the tolerance of the gap defined between the parts.

A device for measuring a seal gap of a vehicle according to an embodiment of the present invention includes a plate member installed in a gap created between a moving part and a mounting part of a vehicle body; a gap sensor mounted to the plate member and configured to measure the dimensions of the seal gap; a transmitter outputting a value measured from the gap sensor; a receiver receiving a signal output from the transmitter; and operation processing equipment configured to process a value from the receiver and output the dimensions of the seal gap.

BRIEF DESCRIPTION OF THE DRAWINGS

For a better understanding of the nature and objects of the present invention, reference should be made to the following detailed description with the accompanying drawings, in which.

DETAILED DESCRIPTION OF THE PREFERRED EMBODIMENTS

The present invention relates to a device for measuring the dimensions of a seal gap which is created between a moving part, such as front/rear doors, a trunk lid, or a tailgate, and a mounting part of a vehicle body that has a corresponding opening and supports the moving part in such a way that the moving part is opened or closed. Typically, a weatherstrip is installed along the mounting body and/or moving part.

In the illustrated embodiment described below, the moving part corresponds to a door panel and the mounting part of the vehicle body corresponds to a seal side panel. However, the moving part and the mounting part of the vehicle body may be applied to various parts of the vehicle body. For example, the moving part may be a trunk lid panel, a tailgate panel, hood, or the like. The mounting part of the vehicle body may be a corresponding door frame, a fender panel, or the like.

Figure 1:
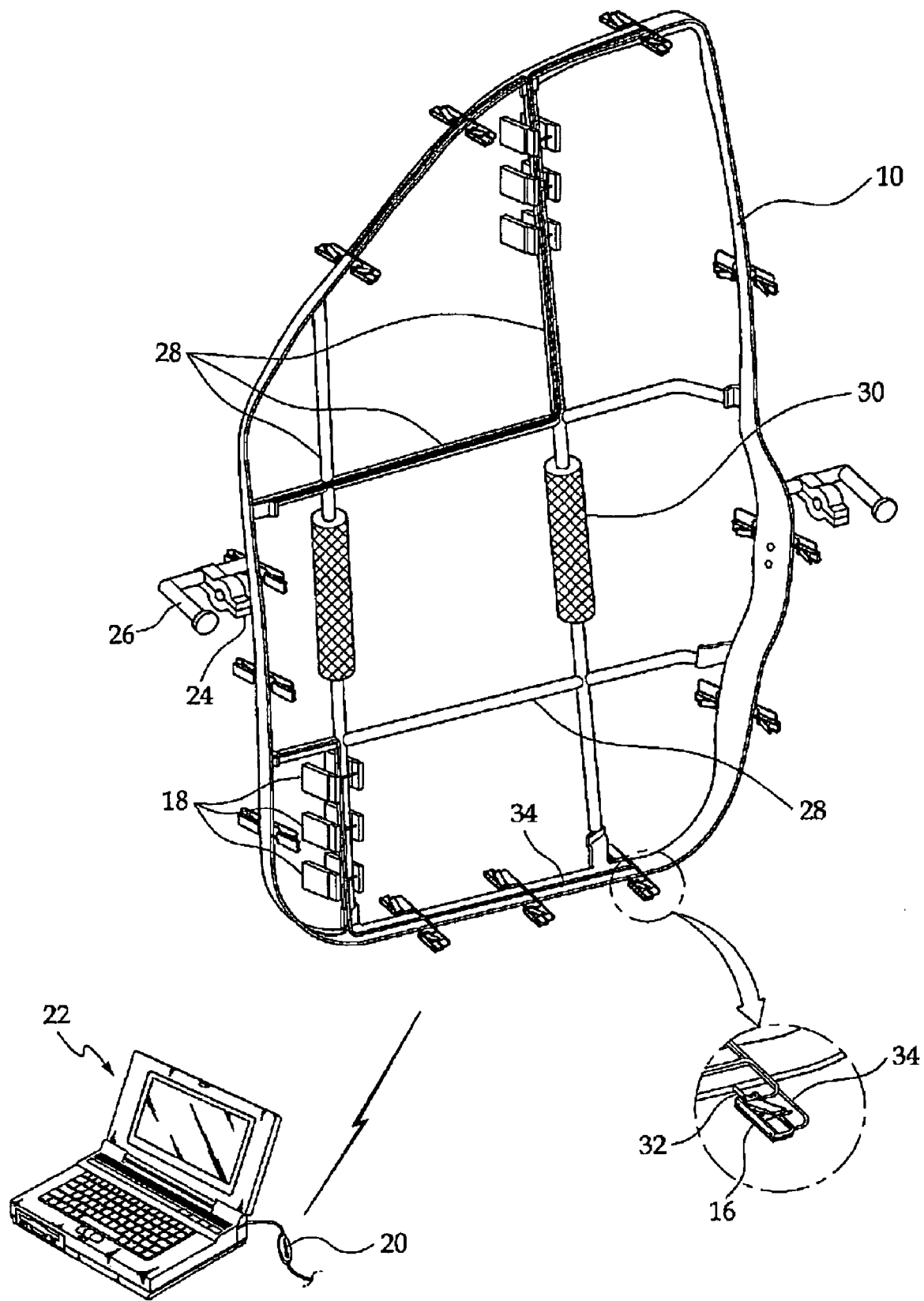
FIG. 1 is a schematic view of a device for measuring a seal gap of a vehicle according to the present invention.
Figure 2:
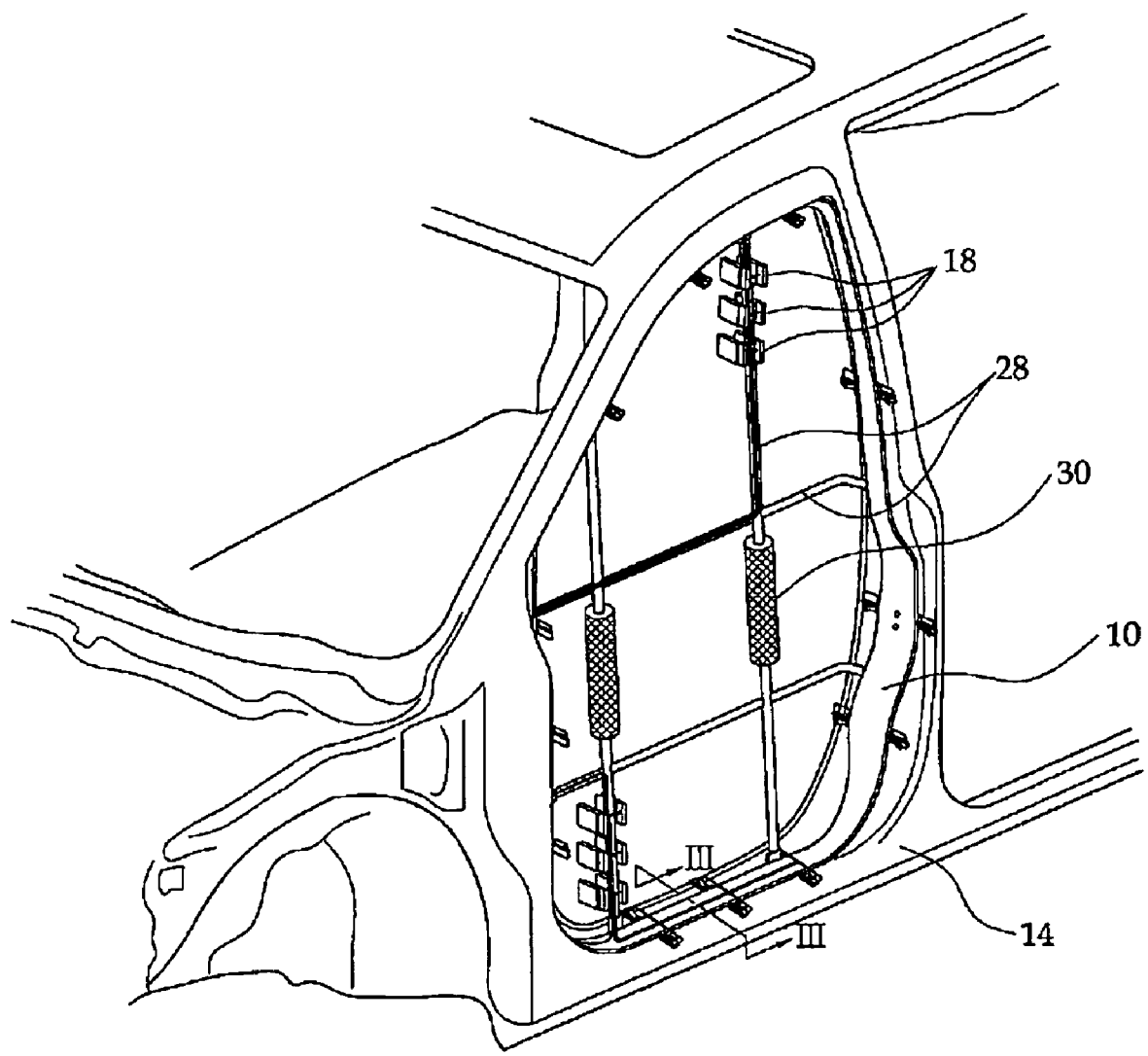
FIG. 2 is a perspective view of the seal gap measuring device of FIG. 1 shown in position during operation.
Figure 3:
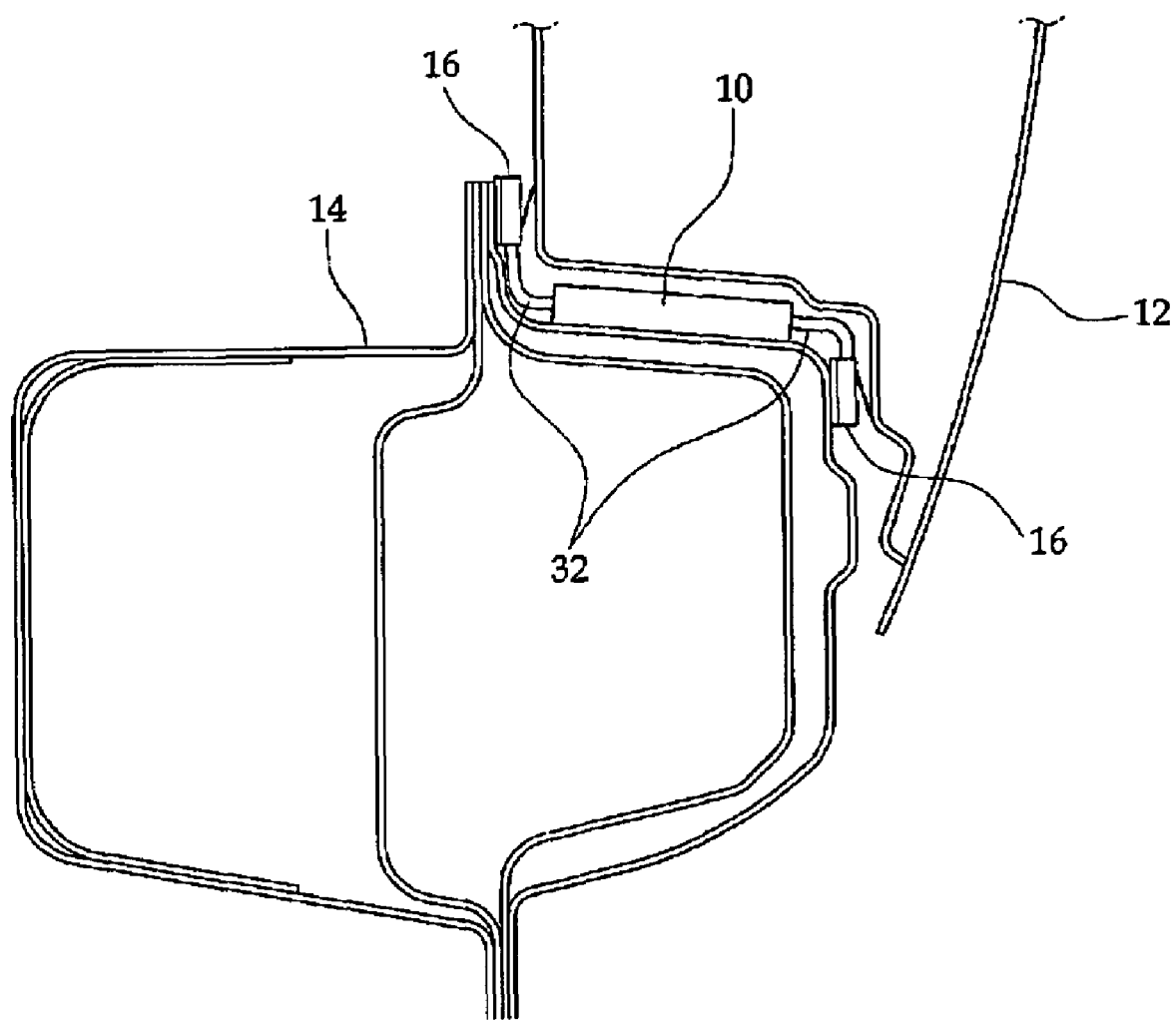
FIG. 3 is a cross-sectional view of the device of FIG. 2 taken along line III-III of FIG. 2, the device shown with a door panel.

As shown in FIGS. 1 to 3, a plate member 10 has a shape corresponding to the gap defined between a door panel 12 and a seal side panel 14. Plate member 10 has a predetermined thickness to be installed in the gap defined between the door panel 12 and the seal side panel 14 and has the shape of a closed loop. The size, shape, and material may vary depending on the particular application and gap to be measured.

A plurality of gap sensors 16 are mounted to the entire circumference of plate member 10 at predetermined intervals and measures a seal gap, which corresponds to the gap between door panel 12 and seal side panel 14 at a plurality of places. As will be understood by one skilled in the art, the placement of the gap sensors may be varied depending on the application.

Transmitters 18 output values measured from gap sensors 16. A receiver 20 receives signals output from transmitters 18. Operation processing equipment 22 converts a value input from receiver 20 into data representing the dimensions of the seal gap prior to outputting the converted result. In this case, the operation processing equipment 22 may comprise a personal computer which has an analysis program for changing the values measured from gap sensors 16 into the dimensions of the seal gap. The output result is may thus be displayed to a user on the computer monitor and/or sent to other processing equipment. The transmitting and receiving configuration may be configured in other manners suitable for the particular application.

More particularly, in the illustrated embodiment gap sensors 16 detect the dimensions of the seal gap, transmitters 18 output the detected data in the form of an analog signal, and receiver 20 sends the received signal to operation processing equipment 22. Meanwhile, operation processing equipment 22 converts the input signal to a digital signal and then expresses the digital signal in numbers using the analysis program. Afterwards, the numerical result is output through a monitor, so that a person can see the results from the exterior.

In one embodiment, plate member 10 is provided with clamps 24 to secure plate member 10 to the mounting part of the vehicle body. Further, plate member 10 is provided with positioning pins 26 which are inserted into positioning holes (not shown) formed in the vehicle body to secure plate member 10 to the mounting part of the vehicle body.

Clamps 24 and positioning pins 26 function to firmly mount plate member 10 to the mounting region defined in seal side panel 14. The portions of plate member 10 to which clamps 24 and positioning pins 26 are mounted are provided at predetermined places according to the position of the mounting part of the vehicle body.

In the illustrated embodiment, plate member 10 is provided with frame members 28 which are arranged within the interior frame of plate member 10. The frame members form a lattice and connect opposite sides of plate member 10 to each other for support and added structural integrity. Thus, the deformation of plate member 10 is resisted by frame members 28 so that plate member 10 can maintain a predetermined shape. In this manner, the overall shape of plate member 10 is configured and dimensioned to maintain the predetermined shape according to the gap between the moving part and the mounting part of the vehicle body.

In one embodiment, handles 30 are provided on frame members 28 so that a worker can hold handles 30 when plate member 10 is carried. Thus, handles 30 help the worker hold plate member 10 when plate member 10 is moved to the mounting part of the vehicle body.

Each of gap sensors 16 is mounted to one end of a flexible connecting member 32 which is movably mounted at the other end thereof to plate member 10. Thereby, each gap sensor 16 is supported at a position which is spaced from plate member 10 via the corresponding flexible connecting member 32.

Figure 4:
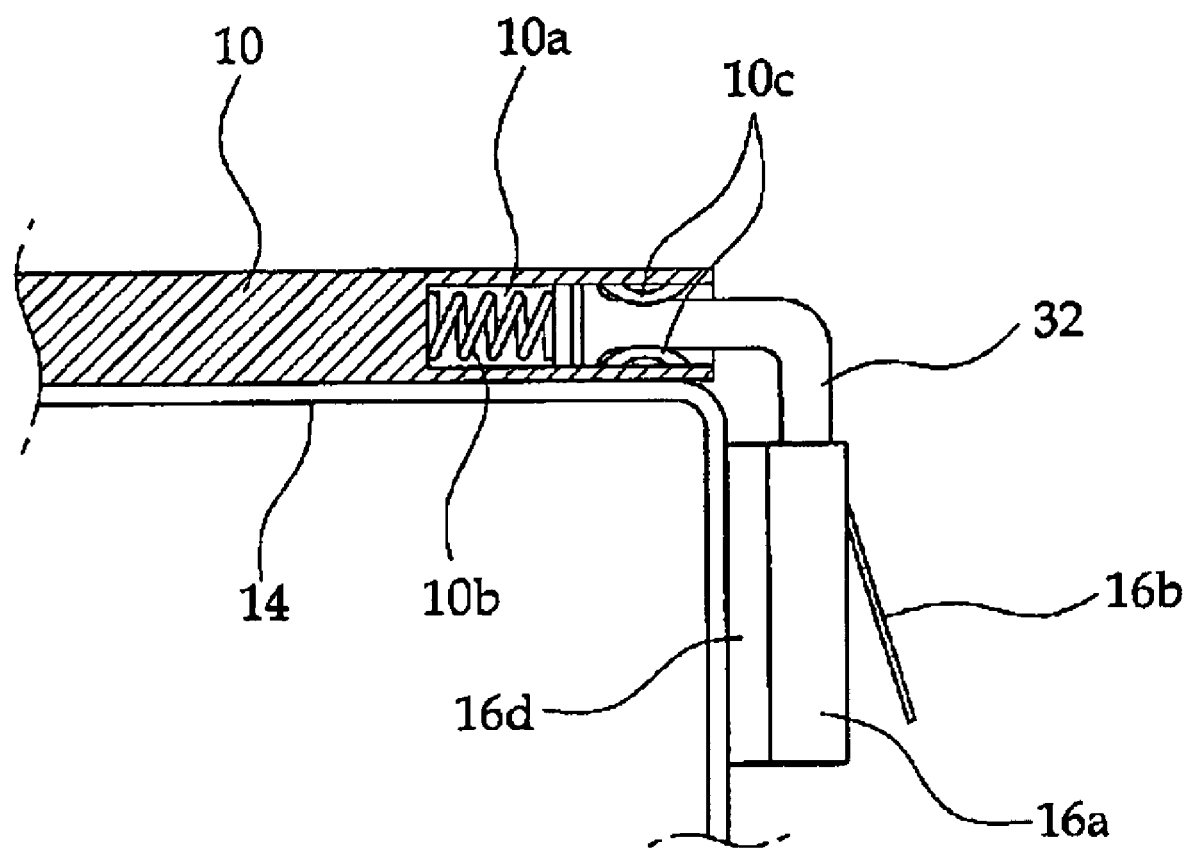
FIG. 4 is an enlarged view of a portion of the device of FIG. 3.
Figure 5:
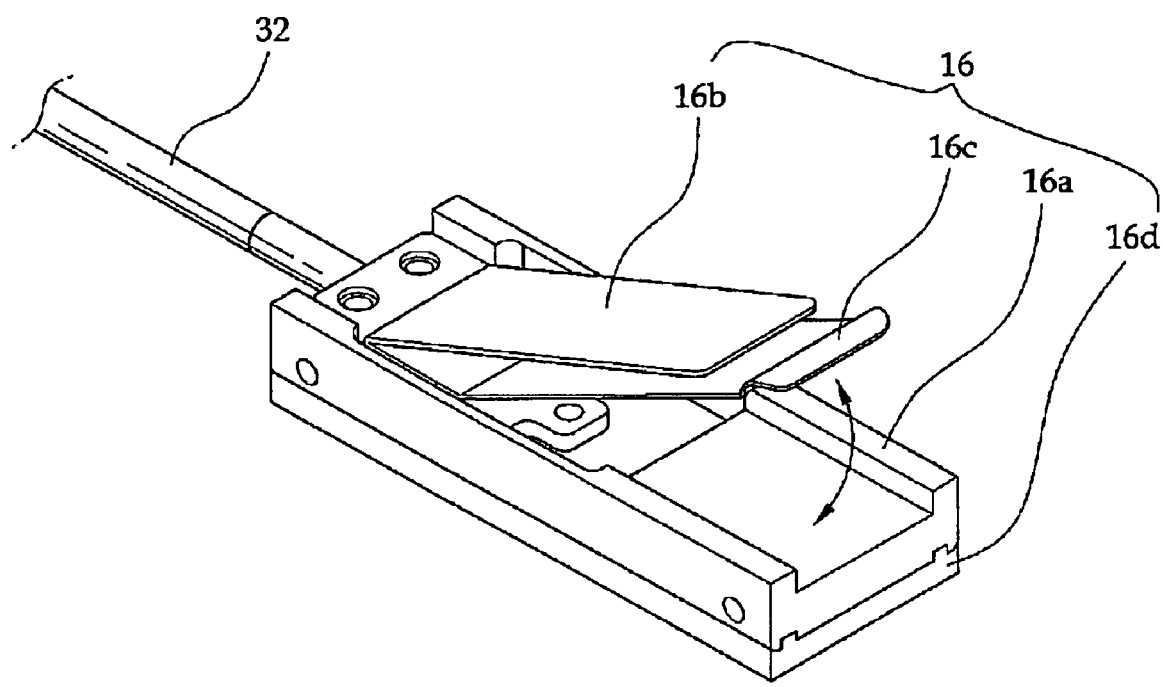
FIG. 5 is a perspective view of the gap sensor of the seal gap measuring device of FIGS. 1 to 4.

As shown in FIGS. 4 and 5, each gap sensor 16 includes a base member 16a, a pressure plate 16b, and an elastic plate 16c. Base member 16a is detachably mounted to the end of the corresponding flexible connecting member 32. Pressure plate 16b is hinged at one end thereof to base member 16a and is pressed by the moving part when the moving part is mounted to the mounting part of the vehicle body. Elastic plate 16c is installed between base member 16a and pressure plate 16b and provides restoring force or biases pressure plate 16b. Gap sensor 16 has a sensing circuit or a sensing element (not shown) that detects the degree of deformation of pressure plate 16b.

Further, in the illustrated embodiment, each gap sensor 16 is provided with a magnet 16d to secure base member 16a to the mounting part of the vehicle body. Magnet 16d is optionally provided on the bottom of base member 16a so as to attach the bottom of base member 16a to the mounting part of the vehicle body.

One end of each flexible connecting member 32 is elastically supported via a return spring 10b in a space 10a defined in the width direction of plate member 10. Plate springs 10c, each having an arc-shaped cross section, are installed in space 10a and bias one end of flexible connecting member 32 to the center of space 10a thus preventing the end of flexible connecting member 32 from moving outside of space 10a.

In this manner, one end of flexible connecting member 32 is elastically biased in space 10a via return spring 10b and biased to the center of the space 10a by plate springs 10c. Thus, the position or direction of the other end of flexible connecting member 32 to be installed in the space between the moving part and the mounting part of the vehicle body is selectably set.

Since flexible connecting member 32 is made of a material which is freely deformable, flexible connecting member 32 is bendable in the gap between the moving part and the mounting part of the vehicle body. Other configurations are envisioned including, but not limited to, use of a combination of a rigid connecting member and elastic member, a movably mounted member and actuator, or the like.

Wires 34 are connected between gap sensors 16 and transmitters 18 and transmit signals detected by gap sensors 16. The length of wires 34 is set to be long, thus allowing wires 34 to be freely arranged between the moving part and the mounting part of the vehicle body.

Figure 6:
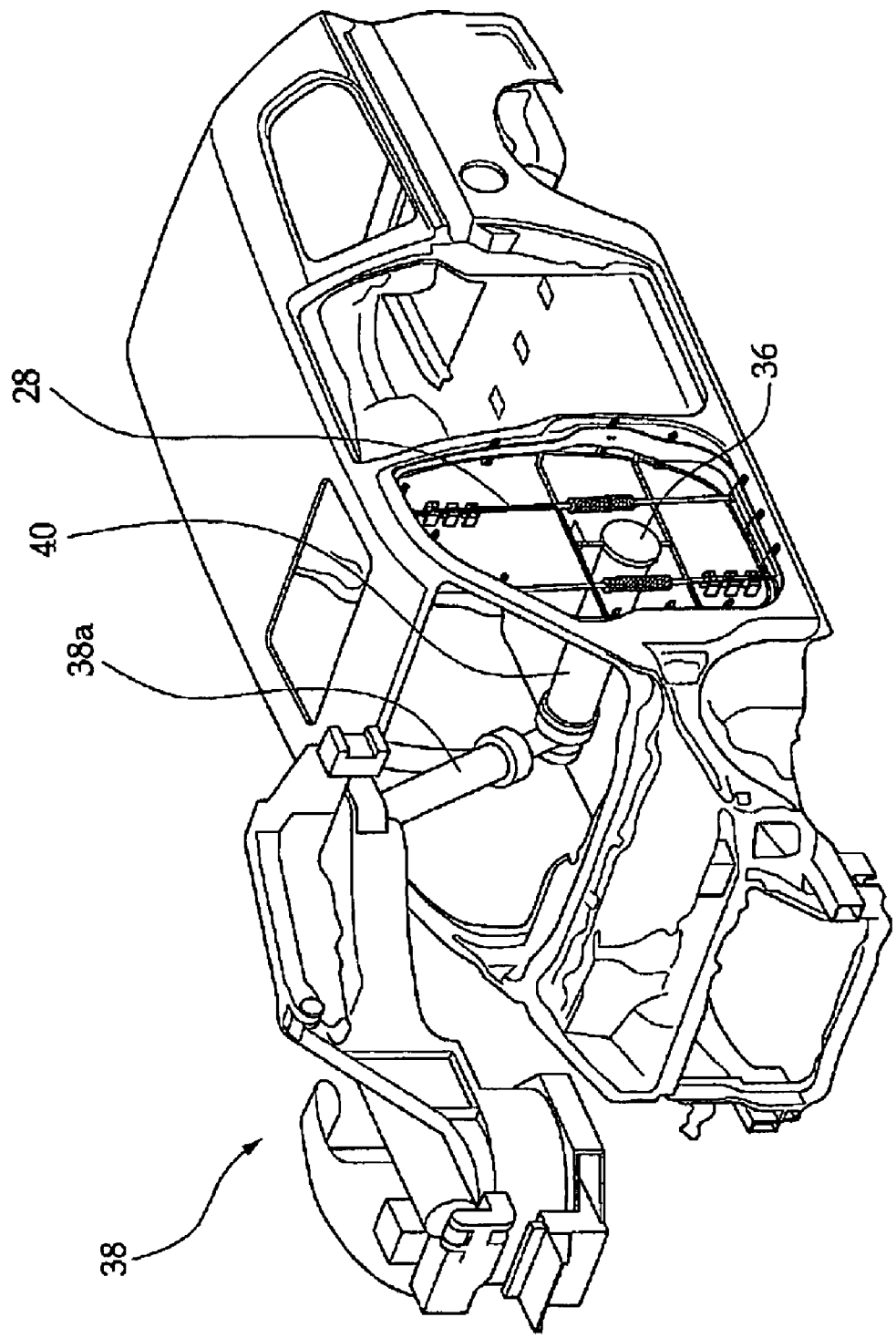
FIG. 6 is a perspective view of the seal gap measuring device of FIG. 1 shown in an assembly line environment.

As shown in FIG. 6, a mounting jig 36 is optionally mounted to frame members 28, and a tool changer 40 is mounted to mounting jig 36 to be connected to an arm 38a of an assembly line robot 38.

The seal gap measuring device of this invention is mounted to arm 38a of assembly line robot 38 so that the seal gap measuring device can be applied to an automated process using assembly line robot 38 in place of being used as a portable device.

When frame members 28 are secured to arm 38a of assembly line robot 38 via tool changer 40, the seal gap measuring device of the present invention is moved in the space between the moving part and the mounting part by assembly line robot 38 thus measuring the gap between the moving part and the mounting part. The seal gap measuring device of the illustrated embodiment is not operated through a manual operating method by a worker and instead operated through an automatic operating method by assembly line robot 38 in an automated assembly line for the vehicle body. However, the seal gap measuring devices may be used by a manual worker or in other configurations as will be understood by one skilled in the art.

The use of the seal gap measuring device by a worker in accordance with the present invention will now be described below.

In order to measure the seal gap between the moving part and the mounting part of the vehicle body, a worker grasps handles 30 provided on frame members 28. Next, plate member 10 is moved to be installed in the space between the moving part and the mounting part of the vehicle body.

Subsequently, when the moving part is closed relative to the mounting part of the vehicle body, the dimensions of the gap between the moving part and the mounting part of the vehicle body is detected by each gap sensor 16. The detected data are input through transmitters 18 and receiver 20 to operation processing equipment 22. The operation processing equipment changes the dimensions of the seal gap into a number based on the input signal prior to outputting the number to the outside.

In the case of an assembly line robot 38, a similar procedure applies except that plate member 10 is moved to the space between the moving part and the mounting part of the vehicle body by assembly line robot 38.

As apparent from the foregoing, there is an advantage in the present invention in that the dimensions of a gap defined between a moving part and a mounting part of a vehicle body can be more conveniently and precisely measured so that the tolerance of the gap between the moving part and the mounting part of the vehicle body can be more precisely and accurately controlled. Thus, weatherstripping having a proper sectional area or a proper cross-section can be installed at the proper position.

Additionally, wind noise generated while a vehicle is driving is efficiently kept out, thus keeping the interior of the vehicle quiet and improving the sealing ability of a moving part relative to a mounting part of a vehicle body.

Further, measuring a seal gap between a moving part and a mounting part of a vehicle body can be more conveniently and precisely conducted, thus improving the reliability of measurement and workability.

What is claimed is:

1. A device for measuring a seal gap of a vehicle, comprising:
    a plate member installed in a gap created between a moving part and a mounting part of a vehicle body, wherein the plate member is shaped to surround the moving part;
    a gap sensor mounted to the plate member and configured to measure the dimensions of the seal gap;
    a transmitter outputting a value measured from the gap sensor;
    a receiver receiving a signal output from the transmitter; and
    operation processing equipment configured to process a value from the receiver and output the dimensions of the seal gap.

2. The device as defined in claim 1, wherein said plate member comprises a clamp and a positioning pin, the clamp being fastened to the plate member and the positioning pin being inserted to secure the plate member to the mounting part of the vehicle body.

3. The device as defined in claim 2, wherein said plate member comprises frame members, the frame members being arranged interiorly of the plate member in a lattice form and connecting opposite sides of the plate member to each other to support the plate member.

4. The device as defined in claim 3, wherein said frame members include a handle configured to allow a worker to hold the plate member.

5. The device as defined in claim 3, wherein a mounting jig is mounted to the frame members, and a tool changer is mounted on the mounting jig to be coupled to an arm of an assembly line robot.

6. The device as defined in claim 1, wherein said gap sensor is coupled to a first end of a flexible connecting member supported at a second end thereof to the plate member.

7. The device as defined in claim 6, wherein said gap sensor comprises:
    a base member coupled to the first end of the flexible connecting member;
    a pressure plate hinged at a first end thereof to the base member and pressed by an external force to pivot around the first end; and
    an elastic plate provided between the base member and the pressure plate and providing restoring force to the pressure plate.

8. The device as defined in claim 7, wherein said gap sensor is provided with a magnet to secure a bottom of the base member to the mounting part of the vehicle body.

9. The device as defined in claim 6, wherein the second end of the flexible connecting member is elastically supported in a space corresponding to the plate member by a return spring, the space having a plate spring disposed therein which elastically biases the second end of the flexible connecting member to a center of the space thus preventing the second end of the flexible connecting member from moving outside of the space.

10. The device as defined in claim 1, wherein a wire is installed between the gap sensor and the transmitter to transmit a detected signal.

11. A device for measuring a seal gap in a vehicle, wherein the seal gap lies between at least a frame portion, the frame portion defining an opening, and openable member, the openable member being receivable in the opening for closure thereof, comprising:
    a plate member configured and dimensioned to be installed in the frame portion opening and to surround the opening;
    a base member flexibly coupled to the plate member;
    a pressure plate hinged at a first end thereof to the base member and pivotable around said first end in response to an external force, said pressure plate being deformable based on the seal gap dimensions;
    an elastic plate disposed between the base member and the pressure plate to provide a restoring force to the pressure plate; and
    a magnet securable between a bottom of the base member and the frame portion.

12. The device of claim 11, further comprising:
    a sensor circuit that detects the deformation of the pressure plate;
    a transmitter configured to output a value from the sensor circuit;
    a receiver configured to receive a signal out put from the transmitter; and
    operation processing equipment configured to process a value from the receiver and output the dimensions of the seal gap.

13. The device of claim 11, where the base member, pressure plate, elastic plate and magnet together define a gap sensor and said device includes plural said gap sensors.

14. The device of claim 11, wherein said plate member comprises a clamp and a positioning pin, the clamp being fastened to the plate member and the position pin being inserted to secure the plate member to the frame portion.

15. A device for measuring a seal gap of a vehicle, comprising:
    a plate member installed in a gap created between a moving part and a mounting part of a vehicle body;
    a gap sensor mounted to the plate member and configured to measure the dimensions of the seal gap directly;
    a transmitter outputting a value measured from the gap sensor;
    a receiver receiving a signal output from the transmitter; and
    operation processing equipment configured to process a value from the receiver and output the dimensions of the seal gap,
    wherein said plate member comprises a clamp and a positioning pin, the clamp being fastened to the plate member and the positioning pin being inserted to secure the plate member to the mounting part of the vehicle body.

16. The device as defined in claim 15, wherein said plate member comprises frame members, the frame members being arranged interiorly of the plate member in a lattice form and connecting opposite sides of the plate member to each other to support the plate member.

17. The device as defined in claim 16, wherein said frame members include a handle configured to allow a worker to hold the plate member.

* * * * *